(12) United States Patent
Hayes

(10) Patent No.: US 9,934,198 B2
(45) Date of Patent: Apr. 3, 2018

(54) APPARATUS FOR PERFORMING MODAL INTERVAL CALCULATIONS BASED ON DECORATION CONFIGURATION

(71) Applicant: Sunfish Studio, LLC, Minneapolis, MN (US)

(72) Inventor: Nathan T. Hayes, Minneapolis, MN (US)

(73) Assignee: Sunfish Studio, LLC, Minneapolis, MN (US)

( * ) Notice: Subject to any disclaimer, the term of this patent is extended or adjusted under 35 U.S.C. 154(b) by 0 days.

(21) Appl. No.: 15/419,215

(22) Filed: Jan. 30, 2017

(65) Prior Publication Data

US 2017/0235703 A1  Aug. 17, 2017

Related U.S. Application Data

(63) Continuation of application No. 14/421,272, filed as application No. PCT/US2013/055162 on Aug. 15, 2013, now Pat. No. 9,558,155.

(60) Provisional application No. 61/683,456, filed on Aug. 15, 2012.

(51) Int. Cl.
| | |
|---|---|
| *G06F 7/00* | (2006.01) |
| *G06F 17/10* | (2006.01) |
| *G06F 7/483* | (2006.01) |
| *G06F 7/499* | (2006.01) |

(52) U.S. Cl.
CPC ............ *G06F 17/10* (2013.01); *G06F 7/483* (2013.01); *G06F 7/49942* (2013.01)

(58) Field of Classification Search
CPC ....... G06F 17/10; G06F 7/483; G06F 7/49989

USPC ........................................................ 708/200
See application file for complete search history.

(56) References Cited

U.S. PATENT DOCUMENTS

| | | | |
|---|---|---|---|
| 5,790,832 A | 8/1998 | Barbier et al. | |
| 6,094,151 A | 7/2000 | Schwartz | |
| 6,658,443 B1 | 12/2003 | Walster | |
| 9,558,155 B2 * | 1/2017 | Hayes | G06F 7/483 |
| 2008/0263335 A1 | 10/2008 | Hayes | |
| 2011/0225221 A1 | 9/2011 | Hayes | |

FOREIGN PATENT DOCUMENTS

| | | |
|---|---|---|
| JP | 2008541202 | 11/2008 |
| WO | 2006107996 | 10/2016 |

OTHER PUBLICATIONS

PCT/US2013/055162, International Preliminary Report on Patentability dated Feb. 17, 2015 (4 pages).
PCT/US2013/055162, International Search Report and Written Opinion of the International Searching Authority dated Jan. 22, 2014 (7 pages).

(Continued)

*Primary Examiner* — Tan V. Mai
(74) *Attorney, Agent, or Firm* — Dicke, Billig & Czaja, PLLC

(57) ABSTRACT

Apparatus performs various modal interval computations, while accounting for various modal interval operand configurations that are not amenable to ordinary computational operations. Upon detecting an exponent field of all 1's, the apparatus adapts various conventions involving leading bits in the fraction field of the modal interval endpoints to return a result having a useful meaning.

3 Claims, 27 Drawing Sheets

(56) References Cited

OTHER PUBLICATIONS

EPO Appln. 13829387.3, Extended European Search Report and European Search Opinion dated Mar. 3, 2016 (6 pages).
Nathan T. Hayes: "Decorations as State Machine", Sep. 18, 2011, XP055252294, http://grouper.ieee.org/groups/1788/email/pdf38EOGnbvjb.pdf (12 pages).
M.H. van Emden: New Developments in Interval Arithmetic and Their Implications for Floating-Point Standardization, arXuvLcs. 0210015v2, dated Oct. 23, 2002 (13 pages).
Introduction to Modal Intervals; Prepared for the IEEE 1788 Working Group by Nathan T. Hayes, Sunfish Studio, LLC, Aug. 21, 2009 (61 pages).
Standard for Modal Interval Arithmetic Draft, Nathan T. Hayes, Feb. 4, 2013 (33 pages).

\* cited by examiner

| (f, X) | X = ∅ | The restriction of f on Set(X) is... |
|---|---|---|
| EIN | T | Defined and Continuous on Empty Input |
| DAC | F | Defined and Continuous |
| DEF | F | Defined |
| GAP | F | Empty or Nonempty |
| NDF | F | Empty |

TABLE 1

| S(f, X) | The restriction of f on Set(X) is... |
|---|---|
| ein | EIN |
| dac | DAC and not EIN |
| def | DEF and not DAC |
| gap | GAP and not (DEF or NDF) |
| ndf | NDF and not EIN |

TABLE 2

| S(f, X) | X = ∅ | $D_f$ = ∅ | Set(X) ⊆ $D_f$ | Set(X) ∩ $D_f$ = ∅ | f cont. on Set(X) |
|---|---|---|---|---|---|
| ein | T | T or F | T | T | T |
| dac | F | F | T | F | T |
| def | F | F | T | F | F |
| gap | F | F | F | F | F |
| ndf | F | T or F | F | T | F |

TABLE 3

| Bit 50 | Bit 49 | Decoration | Description |
|---|---|---|---|
| 1 | 1 | DAC | Defined and Continuous |
| 1 | 0 | DEF | Defined |
| 0 | 1 | GAP | Empty or Nonempty |
| 0 | 0 | NDF | Empty |

TABLE 4

FIG 5

APPARATUS FOR PERFORMING MODAL INTERVAL CALCULATIONS BASED ON
DECORATION CONFIGURATION

CROSS-REFERENCE TO RELATED
APPLICATIONS

This is a continuation of application Ser. No. 14/421,272, now U.S. Pat. No 9,558,155, filed Feb. 12, 2015, which is a USC § 371 national phase entry of international application PCT/US2013/055162 filed Aug. 15, 2013, which is an international application filed under 35 U.S.C. § 363 claiming priority, under 35 U.S.C. § 119(e)(1), of provisional application Ser. No. 61/683,456, previously filed 15 Aug. 2012, under 35 U.S.C. § 111(b).

BACKGROUND OF THE INVENTION

Computer arithmetic is the practice of performing mathematical operations in a computer. Originally proposed in 1945 by John von Neumann, an arithmetic logic unit (ALU) is a digital circuit that performs integer arithmetic and logical operations. The ALU is a fundamental building block of the central processing unit of a computer. Data is provided as input to the ALU, an external control unit tells the ALU what operation to perform on that data, and then the ALU transforms the input data into an output. The input data are called the operands, and the output of the ALU is called the result. Each operation that the ALU is capable of performing may produce a different result for the same set of operands.

In modern computers, the integer operands are typically encoded into digital signals using well-known formats like two's complement or binary coded decimal. An ALU may also calculate with non-integer formats, but these types of ALU are usually given a more specific name. For example, an ALU that performs operations on floating point operands is typically called a floating point unit (FPU). In applicant's U.S. Pat. No. 7,949,700 entitled "Modal Interval Processor," incorporated herein by reference, an ALU taking modal interval operands as input, performing a modal interval operation specified by a selector signal, and then producing a modal interval result is called a modal interval processing unit (MIPU).

Regardless of the formats that any particular type of ALU may calculate with, it is common in many ALU designs to also take as input or produce as output a set of condition codes. These codes may be used to indicate cases such as carry-in, carry-out, zero, parity, etc. However, another common use for these codes is to indicate the presence or absence of exceptional conditions.

An exception is a particular state that may occur in an ALU when an operation is performed on a specific set of operands. For example, the IEEE Standard for Floating Point Arithmetic (IEEE Std 754-2008 In IEEE Std 754-2008, Aug. 29, 2008, pp. 1-58), incorporated herein by reference, defines exactly five (5) exceptions known as Invalid Operation, Division by Zero, Overflow, Underflow and Inexact. In the event any operation conforming to the standard reaches a state characterized by one of these five exceptional conditions, certain mechanisms are specified which allow a user to detect the exceptional condition. One mechanism specified by the standard is to require that a designated exception flag is set. Another mechanism requires the operation to encode a special non-numeric value known as a NaN (Not-a-Number) in the result. In the former case, a user may determine if an exception occurred during an operation by checking to see if the designated exception flag is set. In the latter case, the user may determine if an exception occurred by checking to see if the operation result is a NaN.

Similarly, applicant's U.S. Pat. No. 8,204,926 entitled "Reliable and Efficient Computation of Modal Interval Arithmetic Operations," incorporated herein by reference, discloses a set of digital circuits that allow certain exceptional conditions to be detected in various modal interval arithmetic operations. If an exception is detected, methods similar to those specified in IEEE 754-2008 may allow a user to determine if an exception occurred.

The focus of the present invention is an improved system and method of detecting exceptions in modal interval arithmetic operations (which includes but is not limited to the so-called "classical" interval arithmetic, a distinction made and discussed in applicant's previously referenced patents). As shown in applicant's white paper entitled "Decorations as State Machine," prior art methods of detecting exceptional conditions in interval operations lack several important properties that allow a user to detect certain types of exceptions or else have the potential to lose information about exceptions that may have occurred in prior operations. In the worst case, some prior art methods can under certain circumstances actually provide misleading information or even be totally incorrect. So there is still yet a need for a new and improved system and method to detect exceptional conditions in interval operations that overcome these limitations of prior art methods.

BRIEF DESCRIPTION OF THE INVENTION

Apparatus calculates a first result modal interval dependent on a first modal interval. Each modal interval is defined by first and second endpoints. Each endpoint comprises sign, fraction and exponent bit fields.

The apparatus broadly comprises a first operand register for holding the first and second endpoints, and for providing a first operand signal specifying the contents of the first modal interval endpoints' fields.

The apparatus also includes a first analysis element that receives the first operand signal, that creates first and second truth tables dependent on the first operand signal, and that encodes the first and second truth tables in a first truth tables signal.

The apparatus further includes a first logic array receiving the first operand signal and the first truth tables signal. This first logic array provides a first "empty" bit value signal dependent on the sign, fraction, and exponent field contents of the first and second endpoints.

Lastly, in this broad version, the apparatus also includes a first computational element receiving the first operand signal and the "empty" bit value signal. The first computational element then performs a computation associated with the first computational element using the data encoded in the first operand signal and the "empty" bit value signal. The result of that computation is provided in a first result signal encoding the result of the computation by the first computational element. Such computations may include inverse, transcendental computations, squares, square roots, etc.

In a further version of this invention, the first analysis element creates the first and second truth tables dependent on a preselected exponent field bit configuration in each of the first and second endpoints, and on a preselected fraction field configuration in each of the first and second endpoints.

The broad version of the invention described above may be adapted for calculating a second result modal interval dependent on the first modal interval and on a second modal interval having the same structure as the first modal interval. This version is suitable for modal interval calculations involving two operands such as multiplication, division, adding, and subtracting.

Such a version includes a second operand register for holding the second modal interval, and for providing a second operand signal specifying the contents of the second modal interval's endpoints' fields.

This version includes a second analysis element that receives the second operand signal, that creates third and fourth truth tables dependent on the second operand signal, and that encodes the third and fourth truth tables in a second truth tables signal.

This two operand version also has a second logic array receiving the second operand signal and the second truth tables signal, and providing a second "empty" bit value signal dependent on the sign, exponent, and fraction values in the third and fourth endpoints. A third logic array receives the first and second truth tables signals and generates first and second multiplexer control signals based on the first and second truth tables signals.

This version also includes at least first and second multiplexers each having a control terminal and first and second input terminals. These first and second multiplexers receive respectively the first and second multiplexer control signals at the control terminals thereof. Each multiplexer has first and second data terminals, and each multiplexer gates data present at the one of the first and second data input terminals as selected by the multiplexer control signal to create a multiplexer output signal at an output terminal of the multiplexer involved, that encodes the bit values present at the selected input terminal.

Connections provide to the first multiplexer's first and second data terminals respectively, the values of selected bits in the first and second endpoints' fraction fields.

Other connections provide to the second multiplexer's first and second data terminals respectively the values of selected bits in the third and fourth endpoints' fraction fields.

A second computational element in this version receives the first and second operands signals, the first and second "empty" bit value signals, and the first and second multiplexer output terminal signals. The second computational element then performs a computation associated with the second computational element using the data encoded in the first and second operand signals, the "empty" bit value signals, and the first and second multiplexer output signals. The second computational element provides a second result signal encoding the second result modal interval as a result of the computation by the second computational element.

The apparatus may be further adapted to process at least one of an EIN signal and a GAP signal. Such apparatus comprises third and fourth multiplexers each with the structure of the first and second multiplexers. The third and fourth multiplexers receive the first and second multiplexers' output signals respectively at the first input terminals of the third and fourth multiplexers, and one of the EIN signal and the GAP signal at the second input terminals of the third and fourth multiplexers. The third and fourth multiplexers receive at the control terminals thereof third and fourth multiplexer control signals respectively, and provide at the respective third and fourth multiplexers' output terminals the signal at the respective input terminal specified by the control signal at the respective control terminal.

A fourth logic array receives the first and second truth tables signals and generates therefrom the third and fourth multiplexer control signals.

A further version of this apparatus comprises a comparator receiving the output signals of the first and second multiplexers at first and second input terminals respectively. The comparator provides a comparator output signal having a first value responsive to the value encoded in the first multiplexer's output signal numerically exceeding the value encoded in the second multiplexer's output signal, and a second value otherwise.

This version includes a fifth multiplexer with the structure of the first and second multiplexers. The fifth multiplexer at the first and second input terminals receives the second endpoints recorded in the first and second operand registers, and the comparator output signal at the control terminal. A sixth multiplexer also has the structure of the first and second multiplexers. The sixth multiplexer at the first and second input terminals receives the first endpoints recorded in the first and second operand registers, and the comparator output signal at the control terminal.

The second computational element includes a first sub-element providing as a result of the computation by the second computational element and responsive to a first configuration of the first and second "empty" bit value signals, the data forming the fifth and sixth multiplexer output signals as the first and second endpoints of the result modal interval encoded in the second result signal.

A second sub-element of the second computational element, as a result of the computation by the second computational element and responsive to a second configuration of the first and second "empty" bit value signals different from the first configuration thereof, provides as the second result modal interval encoded in the second result signal, the first and second endpoints recorded in the first operand register as the second and first endpoints of the second result modal interval.

A third sub-element of the second computational element, as a result of the computation by the second computational element and responsive to a third configuration of the first and second "empty" bit value signals different from the first and second configurations thereof, provides as the second result modal interval encoded in the second result signal, the first and second endpoints recorded in the second operand register as the second and first endpoints of the second result modal interval; and A fourth sub-element of the second computational element, as a result of the computation by the second computational element and responsive to a fourth configuration of the first and second "empty" bit value signals different from the first through third configurations thereof, provides as the second result modal interval encoded in the second result signal, the results of a selected modal interval calculation.

DESCRIPTION OF THE FIGURES

FIG. 5 defines the five tracking decorations of the present invention in TABLE 1 and the five static decorations of the present invention in TABLE 2. TABLE 3 is an alternate definition of the static decorations in TABLE 2. TABLE 4 defines bit encodings of tracking decorations in a NaN decoration field of an IEEE 754-2008 binary64 datum.

DESCRIPTION OF THE INVENTION

In furtherance of disclosing important features of the present invention and distinguishing it from the references of prior art, a preliminary overview of related concepts and prior art work is in order.

Natural Domains and Continuity

In the realm of pure mathematics, operations on real numbers are functions that have a natural domain. For example, the square root of a negative real number is not defined, so the natural domain of the square root operation is the set of all non-negative real numbers. Division by zero is also not defined, so the natural domain of the reciprocal operation is the set of all non-zero real numbers. And so on for each contemplated operation. In other words, whenever the input to an operation is not an element of the natural domain of the operation, the operation is not defined.

Continuity is another important property of functions of real numbers. Formal definitions of a continuous function are well-known in the prior art and can be given in terms of sequences or limits of the function. Informally, if a function is continuous then any time a sequence converges in the domain, the image of the sequence in the range also converges. In other words, one could either take the limit first, and then apply the function, or apply the function first, and then take the limits.

Even more particularly, if $f: R^n \to R$ is a function that maps n-dimensional real vectors $R^n$ to real numbers R and $D_f \subseteq R^n$ is the natural domain of $f$, then for any $X \subseteq D_f$, the property of continuity may be further defined in terms of the restriction of $f$ on X. In this case, the only relevant aspect of the continuity property is with respect to the portions of the function $f$ that are restricted to the domain X, wherein X is a subset of the natural domain $D_f$ of the function.

Figure 1:
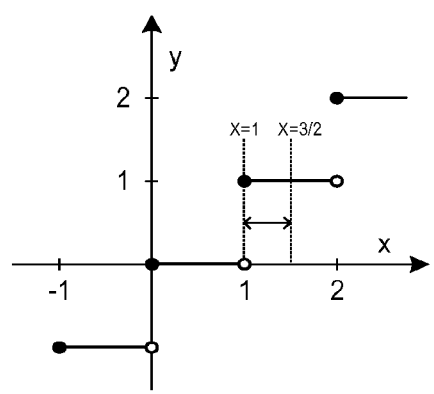
FIG. 1 depicts the natural domain of the floor function, which is the entire real number line. The function is not continuous on its natural domain, however the restriction of the function to the interval X=[1,3/2] is continuous.

For example, consider the function floor(x): $R \to R$ depicted in FIG. 1 which rounds the real number x to the closest integer n such that n≤x. The floor function is defined for any real number x. So the natural domain of the function is the entire real number line. However, the function is not continuous on its natural domain. This is because, for example, if x=1 there is no sequence or limit from the left of x=1 that converges to $f(x)=1$. However, if the restriction of the floor function to the interval X=[1, 3/2] is instead considered, then the floor function is continuous on X because there is no x∈X such that x<1 and this means there can be no sequence or limit from the left of x=1.

The restriction of a function to X can be continuous if and only if X is also a subset of the natural domain of the function. For example, the natural domain of the square root operation is the set of all non-negative real numbers. So the restriction of the square root operation to X=[−16, 4] cannot be continuous because there are elements of X=[−16, 4] which do not belong to the natural domain of the operation and for which the operation is not defined. In other words, X in this case is not a subset of the natural domain of the operation.

Because the empty set (∅) is a subset of every set, it is also a subset of all natural domains of all functions. The restriction of a function to the empty set must therefore be contemplated. As it turns out, the restriction of any function to the empty set X=Ø is always defined and continuous. This is perhaps a little counterintuitive, but nonetheless mathematically correct. Formal mathematical reasoning to prove this is well known in the prior art.

Modal Intervals

The present invention is concerned with modal interval arithmetic and modal interval analysis. In particular, the present invention is concerned with an improved system and method of detecting exceptional conditions in modal interval operations. The prior notions of a real function, the natural domain of a real function, and the restriction of a real function to a subset of the natural domain of the function are therefore lifted into the topic of modal intervals.

For the purposes of the present invention, a modal interval is defined as an ordered pair [a, b] such that a and b are real numbers or signed infinities. However, the two pairs [−∞, −∞] and [+∞, +∞] are excluded. Note that no restriction a≤b is required.

The set-theoretic interpretation of a modal interval is defined as $$\text{Set}([a,b])=\{x \in R: \min(a,b) \leq x \leq \max(a,b)\},$$

and the notation x∈[a, b] may be used as an abbreviation for x∈Set([a, b]). The empty set (Ø) is not a modal interval, however Set(Ø)=Ø.

A closed interval includes all of its limit points. Every modal interval [a, b] is a closed interval. If both a and b are real numbers, the modal interval is bounded. If a modal interval is not bounded, then at least one of the endpoints is −∞ or +∞ and the modal interval still contains all of its limit points but not all of its endpoints. Modal intervals of the form $$[-\infty,+\infty],[-\infty,b],[a,+\infty],[+\infty,b],[a,-\infty] \text{ and } [+\infty,-\infty]$$

are therefore understood to be unbounded. Despite the use of square brackets, infinity is never an element of any modal interval, and $$[-\infty,-\infty] \text{ and } [+\infty,+\infty]$$

are by definition not modal intervals.

A modal interval [a, b] is called proper if a≤b. The modal interval is called improper if a≥b. It is called a point or a point-wise modal interval if a=b. Note that a point-wise modal interval is also a proper and an improper modal interval at the same time.

The set of all bounded modal intervals can be visualized as points in the R² plane, where canonical abscissa and ordinate are defined respectively as the left and right bound of a modal interval [a, b], i. e., $$\lambda([a,b])=a \text{ and } \rho([a,b])=b.$$

Figure 2:
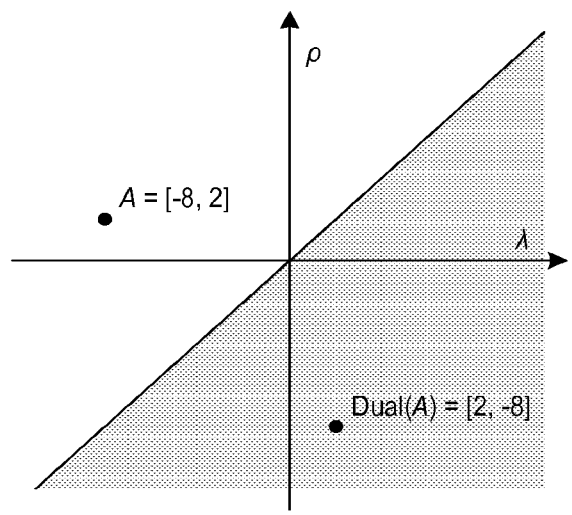
FIG. 2 is a visualization of modal intervals in the $R^2$ plane. Points above the $\lambda=\rho$ line are proper modal intervals and points below this line are improper modal intervals. Points on the line are point-wise modal intervals.

FIG. 2 is such a visualization. Points above the λ=ρ line are proper modal intervals and points below this line are improper modal intervals. Points on the line are point-wise modal intervals. It should be noted the subset of bounded modal intervals visualized in the figure is the famous set known in the prior art as the Kaucher intervals. Also, the subset of the Kaucher intervals on or above the λ=ρ line is the famous set of "classic" intervals popularized in the late 1960's by Ramon E. Moore. The set of classic intervals does not include any improper intervals.

As of this date, the subset of bounded and unbounded proper modal intervals is the set of intervals supported in the working draft of the IEEE Standard for Interval Arithmetic. That standard is currently under development by the P1788 Working Group committee at the time of this writing and does not provide any provision for bounded or unbounded improper intervals. The present invention therefore contemplates the broadest set of "intervals" as it is the only one that consists of a set wherein each element of the set may be bounded or unbounded, proper or improper.

A predicate is a Boolean function, and a proposition is a predicate wherein each variable is universally (∀) or existentially (∃) quantified.

The modal quantifier Q of a modal interval [a, b] quantifies a real variable x by the definition $$Q(x,[a,b])=\text{if } a \leq b \text{ then } \forall x \in \text{Set}([a,b]) \text{else } \exists x \in \text{Set}([a,b]).$$

The modal operators are $$\text{Dual}([a,b])=[b,a],$$

$$\text{Prop}([a,b])=[\min(a,b),\max(a,b)],$$

$$\text{Impr}([a,b])=[\max(a,b),\min(a,b)],$$

and the corresponding modal quantifiers D, E and U are defined as $$D(x,[a,b])=Q(x,\text{Dual}([a,b])),$$

$$E(x,[a,b])=Q(x,\text{Prop}([a,b])),$$

$$U(x,[a,b])=Q(x,\text{Impr}([a,b])).$$

With the modal quantifiers Q, D, E and U it is possible to form propositions with modal intervals. For example, if A and B are modal intervals then the inclusion (⊆) relation is $$A \subseteq B \Leftrightarrow D(a,A)Q(b,B):a=b,$$

and the less-or-equal (≤) relation is $$A \leq B \Leftrightarrow U(a,A)E(b,B):a \leq b \text{ and } U(b,B)E(a,A):a \leq b$$

Figure 3:
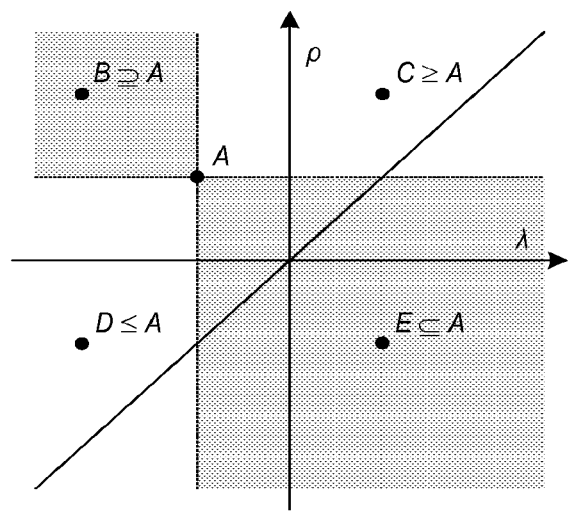
FIG. 3 is a visualization of the inclusion ($\subseteq$) and less-or-equal ($\leq$) relations for modal intervals B, C, D and E relative to modal interval A.

FIG. 3 is a geometric visualization of these modal interval relations in the R² plane. The inclusion and less-or-equal relations are shown for modal intervals B, C, D and E relative to the modal interval A.

If x is a real number, the rounding operators ∇(x) and Δ(x) are digital approximations of x such that the relations $$\nabla(x) \leq x \text{ and } \Delta(x) \geq x$$

are always true. For any modal interval [a, b], $$\text{Inn}([a,b])=[\Delta(a),\nabla(b)] \text{ and } \text{Out}([a,b])=[\nabla(a),\Delta(b)]$$

are the "inner" and "outer" digital roundings, respectively of [a, b].

The inner and outer digital roundings are universally possible for any digital scale and satisfy the property $$\text{Inn}([a,b]) \subseteq [a,b] \subseteq \text{Out}([a,b])$$

such that the equivalence $$\text{Inn}([a,b])=\text{Dual}(\text{Out}(\text{Dual}([a,b])))$$

makes unnecessary the implementation of the inner rounding.

Decorations and Property Tracking

A decoration is a mathematical property of a real function restricted to the domain of its modal interval inputs. Decorations provide a framework for detecting exceptional conditions such as out-of-domain arguments or non-continuous functions.

Looking at the syntactic tree for a real function, where the nodes are operators, the leaves are variables, and branches define the domain of each operator, the real function can be operationally extended to a modal interval expression by using the computational program implicitly defined by the syntactic tree of the real function. This is accomplished by transforming all of the real operators into their modal interval extension and all of the real variables into modal interval variables.

Figure 4:
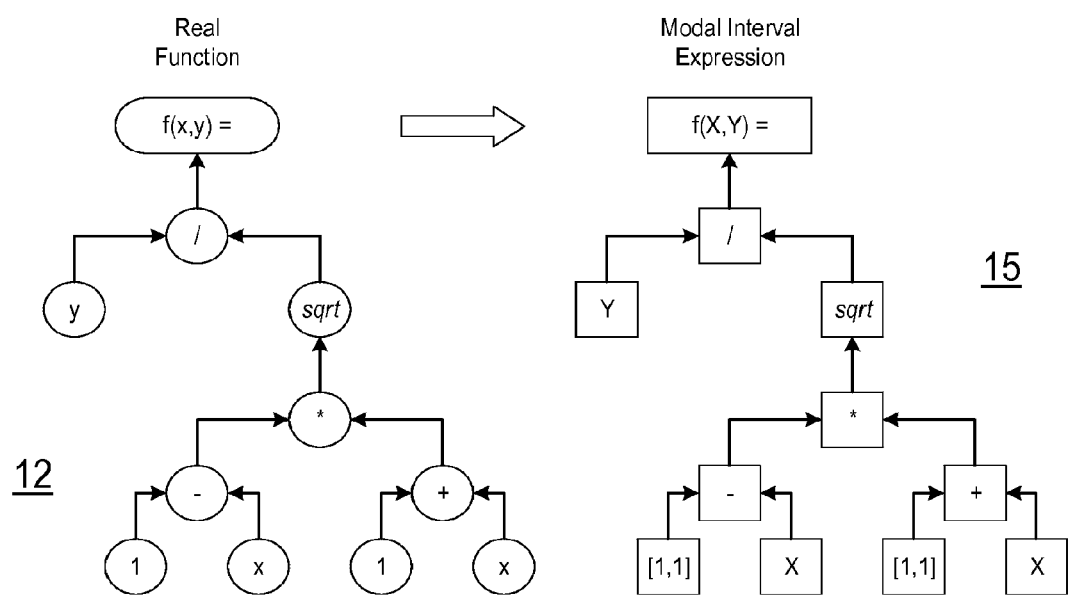
FIG. 4 depicts how the syntax tree of a real function implicitly defines a modal interval expression. Real operators are transformed into their modal interval extension and real variables into modal interval variables.

FIG. 4 is an example that shows how the syntax tree of the real function $$f(x,y)=y/\text{sqrt}((1-x)*(1+x))$$

implicitly defines a modal interval expression. Real operators and variables 12 are respectively transformed into their modal interval counterparts 15. Evaluation of the expression begins at the leafs of the tree, where variables arc propagated up the branches to the operations. The operations accept the variables as operands, perform an operation and generate a result. The result of each operation is then propagated up the branches into other operations until all nodes in the tree have been evaluated and a final result is propagated to the root of the tree.

The present invention makes a distinction between two types of decorations. A static decoration is the absolute mathematical truth about the restriction of an individual operation to the domain of its modal interval inputs. A tracking decoration, on the other hand, is a mathematical implication that is obtained for a modal interval expression by propagating static decorations in the expression tree up the branches and to the root. The method used to propagate static decorations through an expression tree in order to obtain a tracking decoration is called property tracking.

TABLE 1 in FIG. 5 defines the five (5) tracking decorations EIN, DAC, DEF, GAP and NDF of the present invention. If $f: R^n \to R$ is a real function and X is an n-dimensional modal interval box, each tracking decoration is a set whose elements arc the $(f, X)$ pairs which satisfy the stated mathematical property about the restriction of $f$ on Set(X). Furthermore, whenever X is the empty set the $(f, X)$ pair is an element of EIN, otherwise the $(f, X)$ pair must be an element of another decoration.

Figure 6:
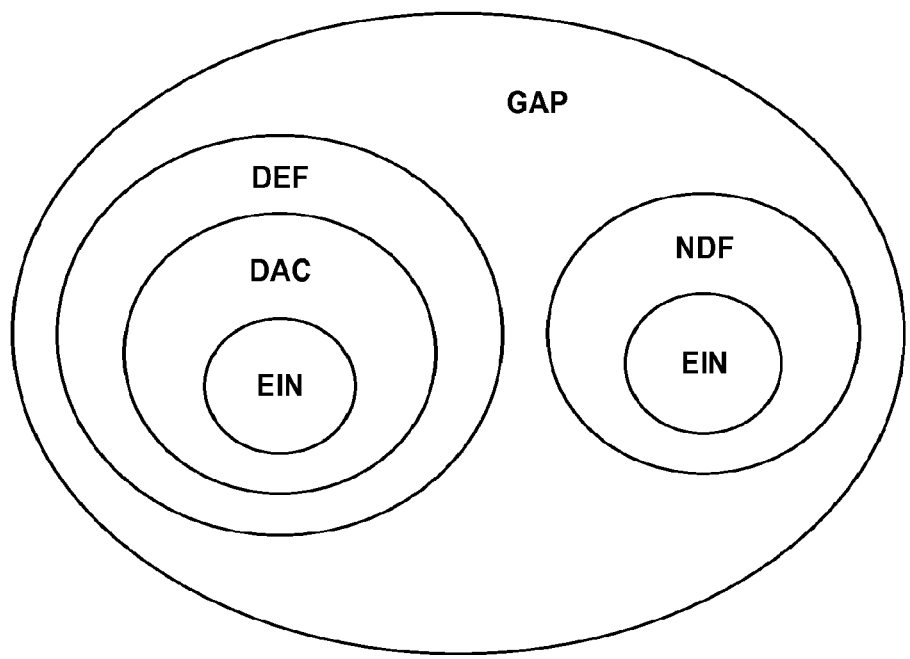
FIG. 6 is a Venn Diagram showing the logical relations between the five sets of tracking decorations of the present invention.

FIG. 6 is a Venn Diagram showing the logical relations between the five sets of tracking decorations. The five tracking decorations form the inclusion relations $$\text{EIN} \subseteq \text{DAC} \subseteq \text{DEF} \subseteq \text{GAP} \supseteq \text{NDF} \supseteq \text{EIN}$$

Note that EIN is a subset of all tracking decorations and GAP is a superset of all tracking decorations.

For example, if $f$ is the square root operator and X=[1, 4] then for this particular $(f, X)$ pair the restriction of $f$ on X is defined and continuous. Since X is not empty, the $(f, X)$ pair cannot be an element of EIN. Additionally, the $(f, X)$ pair cannot be an element of NDF because in this case $f(X)$ is not empty, either. However, if X is the empty set then the $(f, X)$ pair is an element of EIN, and since EIN is a subset of all tracking decorations the $(f, X)$ pair is also an element of DAC, DEF, GAP and NDF.

An important note should be made regarding the prior art as it pertains to decorations. A draft of the IEEE Standard for Interval Arithmetic, which is under development at the time of this writing, contains a decoration system that was at least partially conceived by the applicant of the present invention. That decoration system has some common characteristics to the decoration system of the present invention, such as DEF and DAC decorations. However, there are some important differences, namely the absence of an EIN decoration as well as the inclusion of several other decorations not defined in the present invention such as ILL (ill-formed), COM (a common interval) and BND (a bounded interval). Applicant's white paper entitled "Decorations as State Machine" provides rationale why these competing decoration systems are unnecessary or insufficient for reliable interval computations and how the unique decoration system of the present invention overcomes those issues.

TABLE 2 in FIG. 5 presents the five (5) static decorations ein, dac, def, gap and ndf of the present invention. Note that static decorations have the same names as tracking decorations, but the tracking decorations are uppercase and the static decorations are lowercase.

For any $(f, X)$ pair, the notation $S(f, X)$ indicates which static decoration the $(f, X)$ pair is an element of as a function of TABLE 2. If $f$ has n operands, the notation $S(f, X)$ is shorthand for $S(f, X_1, X_2, \ldots, X_n)$.

If $f: R^n \to R$ is a real function and $D_f \subseteq R^n$ is the natural domain of $f$, and if X is an n-dimensional modal interval box, then TABLE 3 in FIG. 5 is an alternate definition of $S(f, X)$ that defines the same sets as TABLE 2 in FIG. 5.

Figure 7:
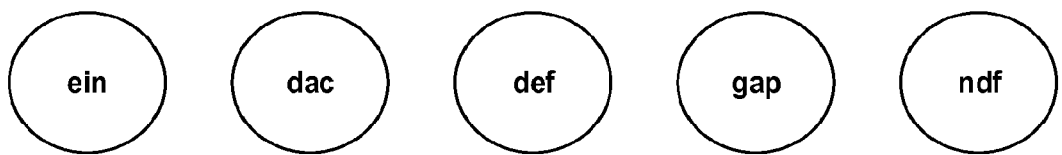
FIG. 7 is a Venn Diagram showing the logical relations between the five sets of static decorations of the present invention.

FIG. 7 is a Venn Diagram showing the logical relations between the five sets of static decorations. While the tracking decorations in TABLE 1 of FIG. 5 partition the universe of all $(f, X)$ pairs into a hierarchical arrangement of nested sets (c. f. FIG. 6), the static decorations in TABLES 2-3 of FIG. 5 partition the universe of all $(f, X)$ pairs into five disjoint sets (c. f. FIG. 7).

For example, if $f$ is the square root operation and $X_1=[2, 4]$, $X_2=[-1, 1]$ and $X_3=[-4, -2]$ then $S(f, X_1)=$dac because $Set(X_1)$ is a nonempty subset of $D_f$ and the restriction of $f$ on $X_1$ is continuous; $S(f, X_2)=$gap because $Set(X_2)$ is not a subset of $D_f$ but the intersection of $Set(X_2)$ and $D_f$ is nonempty; and $S(f, X_3)=$ndf because $X_3$ is not empty but the intersection of $Set(X_3)$ and $D_f$ is empty.

Property tracking is the method used to propagate static decorations through an expression tree in order to obtain a tracking decoration. To facilitate this method, the notion of a decorated interval is contemplated. A decorated interval is a pair $(X, D)$ that consists of a modal interval X and a tracking decoration D. The empty set is not an interval, however the notion of a decorated empty set $(\emptyset, D)$ is also contemplated.

The method of property tracking begins with initialization. Each modal interval variable $X_1, X_2, \ldots, X_n$ in the leafs of the expression tree is promoted to a decorated interval $(X_1, \text{DAC}), (X_2, \text{DAC}), \ldots, (X_n, \text{DAC})$. If any variable in a leaf of the expression tree is an empty set, then the empty variable is promoted to a decorated empty set $(\emptyset, \text{EIN})$. Similarly, if any variable in a leaf of the expression tree is $[+\infty, +\infty]$ or $[-\infty, -\infty]$, then the variable is promoted, respectively, to $([+\infty, +\infty], \text{GAP})$ or $([-\infty, -\infty], \text{GAP})$.

The decorated variables are then propagated up the branches of the expression tree to the operations. The operations accept the decorated variables as operands, perform an operation and generate a decorated result. For each operation, if $f: R^n \to R$ is the real function and $$(X_i, D_i)=((X_1, D_1), (X_2, D_2), \ldots, (X_n, D_n))$$

are the decorated interval operands of $f$, then the decorated result of the operation has the tracking decoration $$T(f, (X_i, D_i))=\min\{S(f, X_1, X_2, \ldots, X_n), D_1, D_2, \ldots, D_n\}.$$

In other words, the decorated result of the operation has a tracking decoration which is the minimum element of a set formed by the union of the static decoration $S(f, X_1, X_2, \ldots, X_n)$ of the operation and the decorations $D_1, D_2, \ldots, D_n$ of the operands.

For the sake of determining the minimum element of a set of decorations, the decorations are linearly ordered $$\text{ndf/NDF} < \text{gap/GAP} < \text{def/DEF} < \text{dac/DAC} < \text{ein/EIN}$$

The decorated result of each operation is then propagated up the branches into other operations. The procedure is repeated until all nodes in the tree have been evaluated and a final decorated result is propagated to the root of the tree.

Digital Encodings of Modal Intervals and Decorations

Inside a computer, the endpoints of a modal interval may be represented by elements of a digital scale. In a preferred embodiment of the present invention, the digital scale conforms to the binary64 interchange format encoding of IEEE 754-2008. For the sake of discourse, only the binary64 encoding will be explained or considered in the rest of this document. However, the use of other digital scales or interchange format encodings as it pertains to the present invention should be obvious.

Figure 8:
FIG. 8 depicts an IEEE 754-2008 interchange encoding for a binary64 datum. The NaN decoration field in bits 49 and 50 is not part of the IEEE 754-2008 standard and is defined solely for the sake of the present invention.

A binary64 floating-point datum is 64 bits of information partitioned into sign, exponent and fraction fields as shown in register 20 of FIG. 8. The fraction field is in bits 0 to 51; the exponent field is in bits 52 to 62; and the sign field is the most significant bit 63. The floating-point data represented by this encoding is:

Zero. If the exponent and fraction are zero, then the floating-point data is a positive or negative zero +0 or −0 when the sign bit is 0 or 1, respectively.

Non-zero finite number. If the exponent and fraction are not zero and the exponent bits are not all 1, then by definition the floating-point data is a positive or negative non-zero finite number when the sign bit is 0 or 1, respectively.

Infinity. If the exponent bits are all set to 1 and the fraction is zero, then the floating-point data is +∞ or −∞ when the sign bit is 0 or 1, respectively. The infinities are the maximum numbers that can be represented in floating-point format. Negative infinity is less than any finite number and positive infinity is greater than any finite number.

NaN (Not-a-Number). If the exponent bits are all set to 1 and the fraction is not zero, then the floating-point data is a non-number that lies outside the range of representable floating-point numbers, regardless of the sign bit. If bit 51 is set to 1, then the NaN is quiet (QNaN); otherwise the NaN is signaling (SNaN). For the purposes of the present invention, bits 49 to 50 are the NaN decoration field. The NaN decoration field is not part of the IEEE 754-2008 standard and is defined solely for the sake of the present invention.

Figure 9:
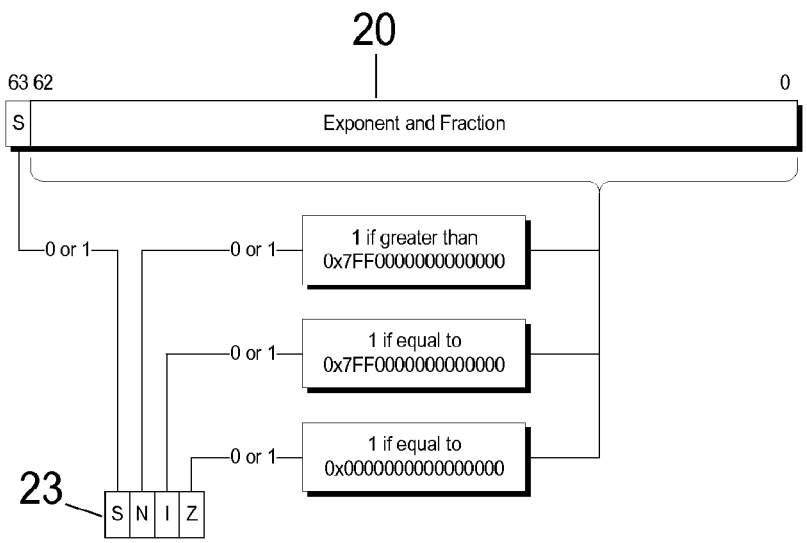
FIG. 9 is a logic diagram that defines a truth table consisting of Sign (S), NaN (N), Infinity (I) and Zero (Z) classification bits for a binary64 datum.

A binary64 datum may be associated with a truth table 23 consisting of a set of classification bits as depicted in FIG. 9. The classification bits consist of a Sign (S), NaN (N), Infinity (I) and Zero (Z) bit. Bit 63 of the binary64 datum is copied to the Sign bit. The NaN, Infinity and Zero bits are set to 0 or 1 depending on the combined value of the exponent and fraction of the binary 64 datum. If the combined value is greater than 0x7FF0000000000000, then the NaN bit is set to 1; if the combined value is equal to 0x7FF0000000000000, then the Infinity bit is set to 1; if the combined value is equal to zero, then the Zero bit is set to 1; otherwise the respective NaN, Infinity and Zero bits are set to 0 and the binary64 datum is a positive or negative non-zero finite number.

If x is a floating-point datum, then S(x), N(x), I(x) and Z(x) are notations used in this document to represent the respective values of the Sign, NaN, Infinity and Zero classification bits of truth table 23.

If bit 51 of a NaN is set to 1, then the NaN is quiet (QNaN); otherwise the NaN is signaling (SNaN). If the NaN is signaling, at least one other fraction bit of the NaN must be set to 1 to distinguish the NaN from an infinity. The difference between a quiet and signaling NaN is for the sake of compatibility with IEEE 754-2008 standard interchange format encoding. However, the present invention does not require signaling NaN operations.

Bits 0 to 50 are the NaN "payload." All bits of the payload may be set to any value so long as the entire fraction field of a NaN does not become zero. The preferred embodiment of the present invention may use bits 49 to 50 of a NaN payload as a NaN decoration field to encode a representation of a tracking decoration.

If x is a NaN, then T(x) is the representation of a tracking decoration encoded within the NaN decoration field of x as depicted in TABLE 4 of FIG. 5. The tracking decoration EIN has no designated encoding within the NaN decoration field. The reason for this will be shown in the following parts of the document.

If n is the representation of a tracking decoration, then NaN(n), QNaN(n) and SNaN(n) are notations used in this document to represent the respective encodings of a NaN, quiet NaN or signaling NaN when the bits of the decoration field are set to the corresponding value of n as depicted in TABLE 4 of FIG. 5.

Figure 10:
FIG. 10 depicts a modal interval datum $[a_1, a_2]$, which is encoded into 128 bits as two binary64 datums $a_1$ and $a_2$.

A modal interval datum [$a_1$, $a_2$] may be encoded into 128 bits as two binary64 datums $a_1$ and $a_2$ as illustrated in register 27 of FIG. 10. If $a_1$ or $a_2$ is a NaN, or if $a_1$ and $a_2$ are infinities with the same sign, then the 128-bit encoding represents non-interval data.

All non-interval data is an encoding of a decorated empty set.

If $a_1$ and $a_2$ are binary64 datums that do not represent a NaN, and if n is a representation of one of the tracking decorations DAC, DEF, GAP or NDF (see TABLE 1 in FIG. 5) encoded in a NaN decoration field as depicted in TABLE 4 of FIG. 5, then a decorated empty set (Ø, n) is encoded by any non-interval data of the form

[$a_1$,NaN(n)] or [NaN(n),$a_2$].

Any such encoding of a decorated empty set (Ø, n) may be provided as input to an operation of the present invention, and a canonical encoding

[+0,QNaN(n)] or [QNaN(n),+0]

may be provided as a result of an operation which produces a decorated empty set as output.

Non-interval data of the form

[NaN,NaN]

is an encoding of the decorated empty set (Ø, EIN), and non-interval data of the form

[−∞,−∞] or [+∞,+∞]

is an encoding of the decorated empty set (Ø, GAP).

Figure 11:
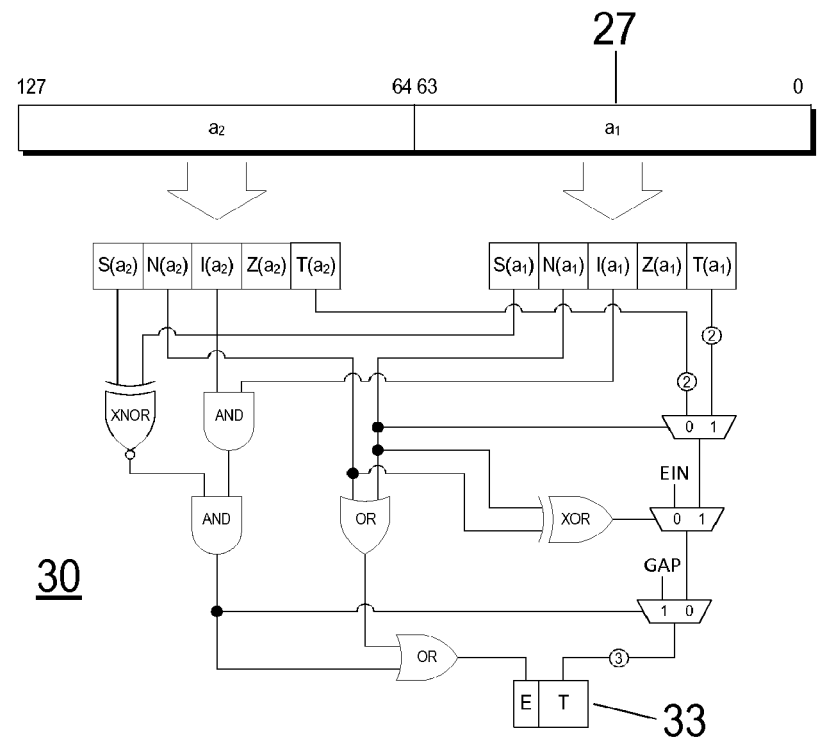
FIG. 11 is a logic diagram that defines the Empty (E) bit and Tracking Decoration (T) of a modal interval datum.

FIG. 11 shows how a modal interval datum [$a_1$, $a_2$] is classified by an Empty (E) bit and a representation of a Tracking Decoration (T). The classification 33 is a function of truth tables each consisting of the Sign (S), NaN (N) and Infinity (I) bits, respectively, of the binary64 datums $a_1$ and $a_2$, as well as the respective NaN decoration field of $a_1$ or $a_2$, if either $a_1$ or $a_2$ is a NaN. The logic diagram 30 computes the classification 33 according to the following specifications.

The Empty bit in FIG. 11 is set to 1 if $a_1$ and $a_2$ are both infinities with the same sign or if $a_1$ or $a_2$ is a NaN; otherwise the Empty bit is set to 0. If $a_1$ and $a_2$ are infinities with the same sign, the Tracking Decoration is GAP; if $a_1$ is a NaN and $a_2$ is not, the Tracking Decoration is a representation of the NaN decoration field from $a_1$; if $a_2$ is a NaN and $a_1$ is not, the Tracking Decoration is a representation of the NaN decoration field from $a_2$; otherwise the Tracking Decoration is EIN. Strictly speaking, the Tracking Decoration has no meaning unless the Empty bit is set to 1. If the Empty bit is 0, the modal interval datum is a bounded or unbounded modal interval and the Tracking Decoration is not used.

If $[a_1, a_2]$ is a modal interval datum, then $E(a_1, a_2)$ and $T(a_1, a_2)$ are notations used in this document to represent the respective values of the Empty bit and the Tracking Decoration.

Modal Interval Operations with Decorations

The present invention provides an improved system and method for reliable and efficient modal interval operations using decorations. The preferred embodiment of the present invention is an arithmetic functional unit (AFU) as depicted in applicant's U.S. Pat. No. 7,949,700 entitled "Modal Interval Processor." Modal interval operand and result signals for the AFU are digitally encoded using the methods described in the previous section of this document entitled "Digital Encodings of Modal Intervals and Decorations."

As will be shown subsequently for select modal interval operations, the result of a modal interval operation is typically obtained by performing a floating-point calculation on select endpoints of the modal interval operands. Because floating-point calculations are often inexact, the present invention requires the rounding operators $\nabla(x)$ and $\Delta(x)$ to ensure modal interval results obey the "outer" digital rounding of modal intervals.

Figure 12:
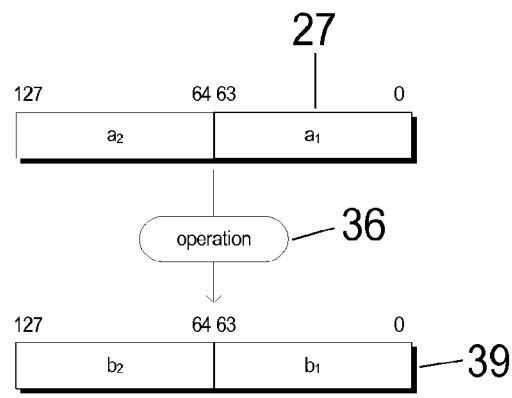
FIG. 12 depicts a unary modal interval operation, which takes an operand $[a_1, a_2]$ as input and produces a result $[b_1, b_2]$.

FIG. 12 shows a unary modal interval operation for example computes in a functional element 36. Element 36 may comprise one or more sub-elements and may be implemented as hardware, firmware or software. Element 36 takes an operand $[a_1, a_2]$ held in register 27 as input and produces a result $[b_1, b_2]$ held in a result register 39.

Figure 13:
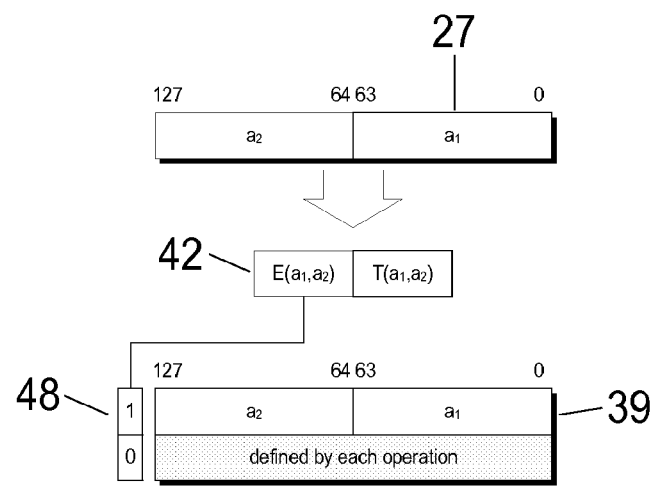
FIG. 13 is a logic diagram for a unary modal interval operation using decorations.

FIG. 13 is a more detailed logic diagram of FIG. 12. A truth table 48 specifies the value in result register 39. The truth table is a function of the Empty (E) bit 42 associated with operand 27. A truth table value of 0 selects the computation function associated with the particular operation. The other truth table value specifies the result 39 is a copy of operand 27. Therefore, if $[a_1, a_2]$ is an encoding of non-interval data, i. e., if $[a_1, a_2]$ is an encoding of a decorated empty set, then the operand $[a_1, a_2]$ is the result of the operation. Otherwise $[a_1, a_2]$ is an encoding of a bounded or unbounded modal interval and the result is defined separately for each operation.

FIGS. 14-24 depict the result of several unary modal interval operations after a determination has been made that the operand $[a_1, a_2]$ in FIG. 13 is an encoding of a bounded or unbounded modal interval.

Figure 14:
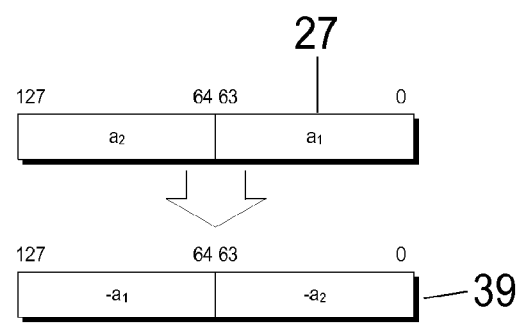
FIG. 14 is a logic diagram for a modal interval negation operation.

FIG. 14 is a logic diagram for a modal interval negation operation. The operation effectively multiplies the modal interval by −1. Since negation of floating-point numbers is exact, the modal interval negation operation is exact and requires no rounding operators.

Figure 15:
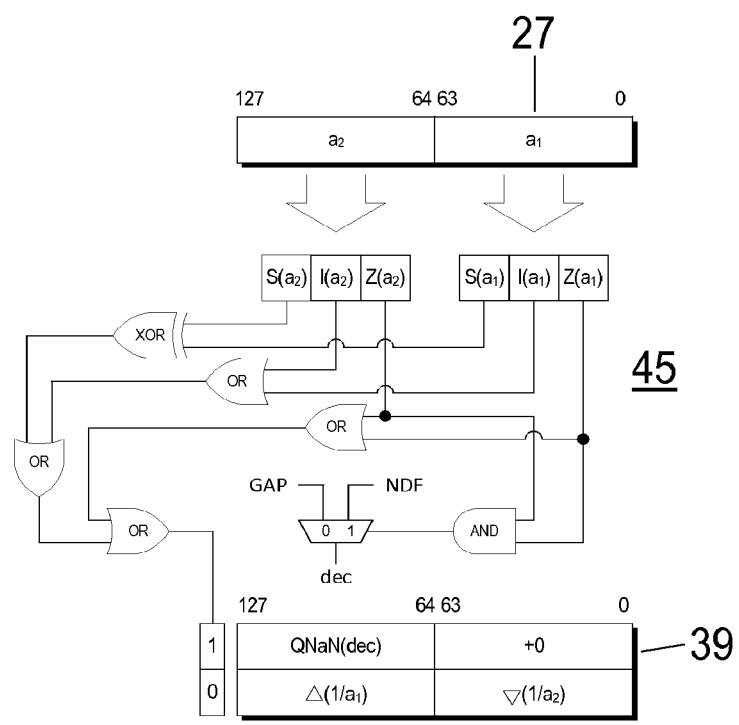
FIG. 15 is a logic diagram for a modal interval reciprocal operation.

FIG. 15 is a logic diagram for a modal interval reciprocal operation. The operation is defined if and only if $a_1$ and $a_2$ are both non-zero numbers with the same sign, otherwise the result of the operation is a decorated empty set. If $a_1$ and $a_2$ are both zero, the empty set is decorated with ND F; otherwise the empty set is decorated with GAP.

Figure 16:
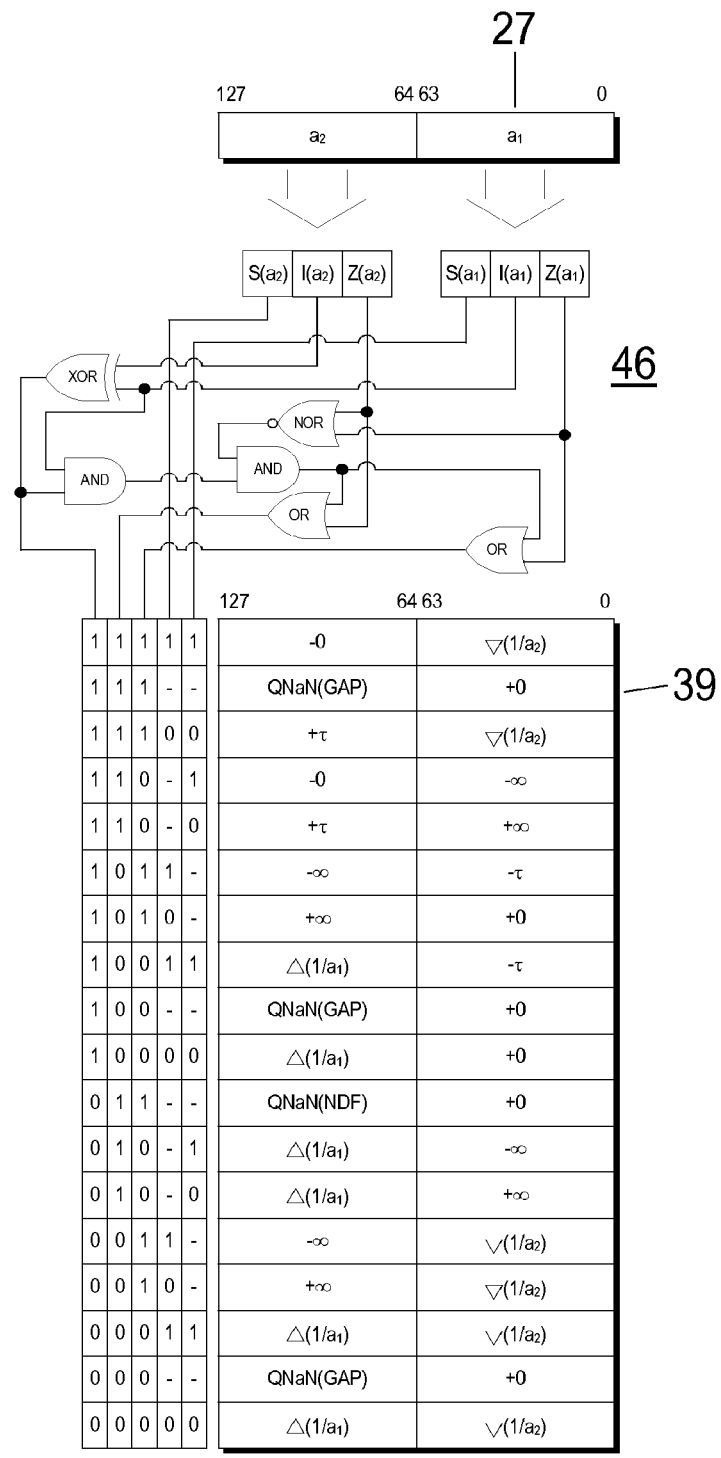
FIG. 16 is a logic diagram for a restricted modal interval reciprocal operation.

FIG. 16 is a logic diagram for a restricted modal interval reciprocal operation. The operation silently removes zero from the input of the operation. Unlike the modal interval reciprocal operation in FIG. 15, the operand $[a_1, a_2]$ may have one endpoint that is zero.

Figure 17:
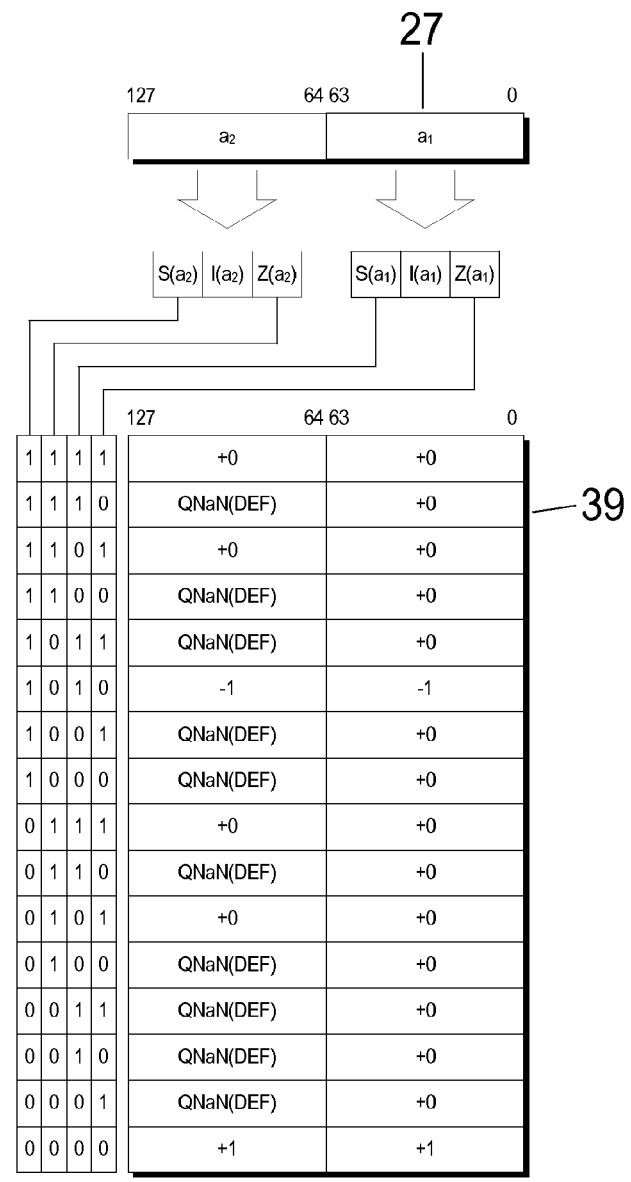
FIG. 17 is a logic diagram for a modal interval sign operation.

FIG. 17 is a logic diagram for a modal interval sign operation. The operation is defined for the entire real number line. However, the operation is continuous if and only if $a_1$ and $a_2$ are both strictly positive, both strictly negative or both zero. If the operation is not continuous, the result is an encoding of the decorated empty set (Ø, DEF).

Figure 18:
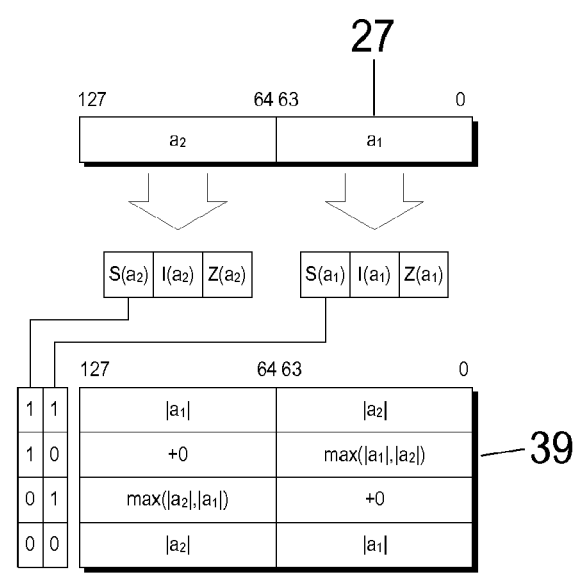
FIG. 18 is a logic diagram for a modal interval absolute value operation.

FIG. 18 is a logic diagram for a modal interval absolute value operation. Since absolute value of a floating-point number $a_1$ or $a_2$ is exact, the modal interval absolute value operation is exact and requires no rounding operators.

Figure 19:
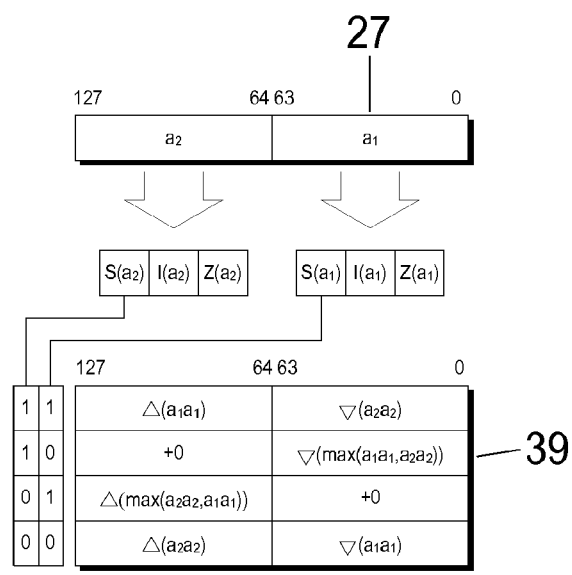
FIG. 19 is a logic diagram for a modal interval square operation.

FIG. 19 is a logic diagram for a modal interval square operation.

Figure 20:
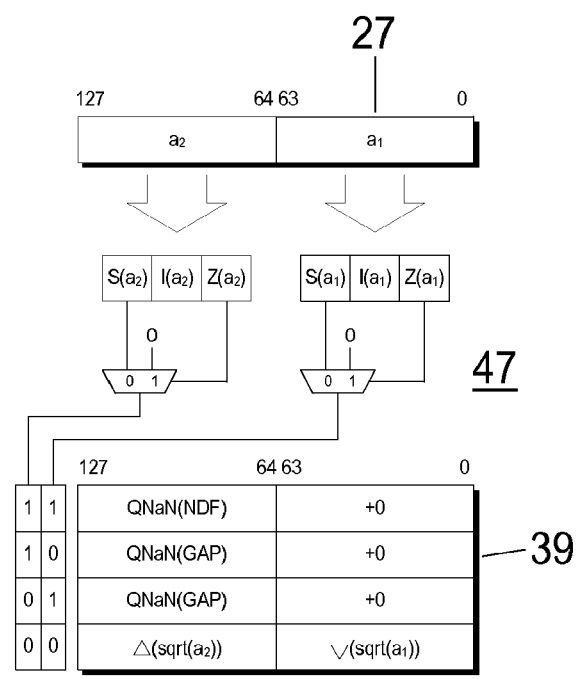
FIG. 20 is a logic diagram for a modal interval square root operation.

FIG. 20 is a logic diagram for a modal interval square root operation. The operation is not defined if $a_1$ or $a_2$ is a negative non-zero number. In conformance to the IEEE 754-2008 standard, this allows −0 to be an element of the natural domain of the operation. If $a_1$ or $a_2$ is a negative non-zero number, the result of the operation is a decorated empty set. If $a_1$ and $a_2$ are both negative non-zero numbers, the empty set is decorated with NDF; otherwise the empty set is decorated with GAP.

Figure 21:
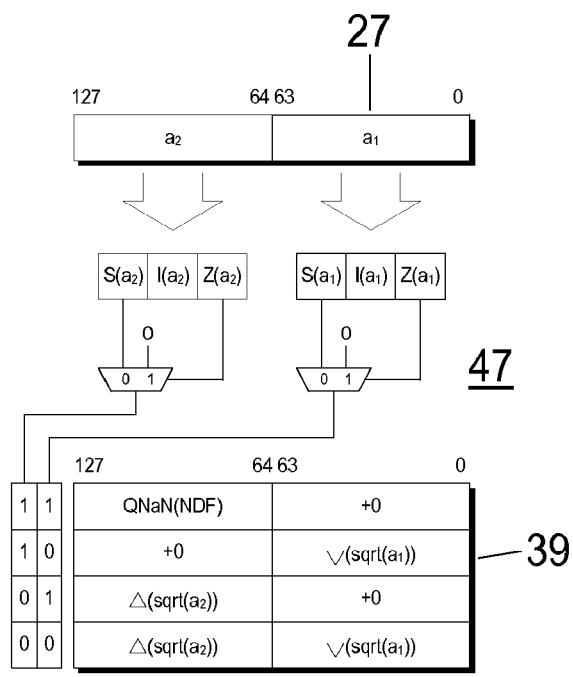
FIG. 21 is a logic diagram for a restricted modal interval square root operation.

FIG. 21 is a logic diagram for a restricted modal interval square root operation. The operation silently removes negative non-zero numbers from the input of the operation. Unlike the modal interval square root operation in FIG. 20, the operand $[a_1, a_2]$ may have one negative non-zero number as an endpoint, so long as $a_1$ and $a_2$ are not both negative non-zero numbers.

Figure 22:
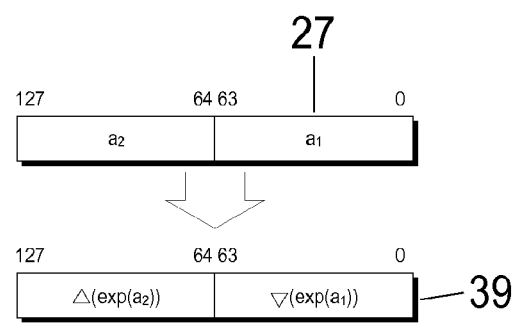
FIG. 22 is a logic diagram for a modal interval exponential operation.

FIG. 22 is a logic diagram for a modal interval exponential operation.

Figure 23:
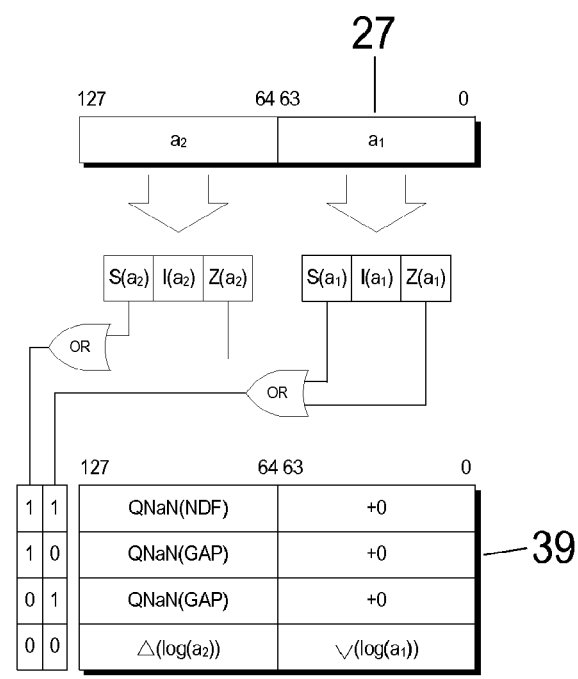
FIG. 23 is a logic diagram for a modal interval logarithm operation.

FIG. 23 is a logic diagram for a modal interval logarithm operation. The operation is defined if and only if $a_1$ and $a_2$ are both non-zero positive numbers. If $a_1$ or $a_2$ is less-or-equal to zero, the result of the operation is a decorated empty set. If $a_1$ and $a_2$ are both less-or-equal to zero, the empty set is decorated with NDF; otherwise the empty set is decorated with GAP.

Figure 24:
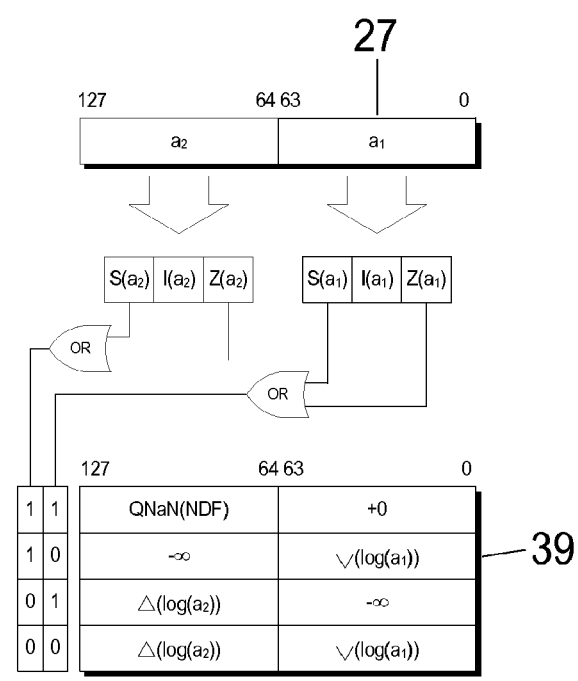
FIG. 24 is a logic diagram for a restricted modal interval logarithm operation.

FIG. 24 is a logic diagram for a restricted modal interval logarithm operation. The operation silently removes negative numbers and zero from the input of the operation. Unlike the modal interval logarithm operation in FIG. 23, the operand $[a_1, a_2]$ may have one endpoint less-or-equal to zero, as long as $a_1$ and $a_2$ are not both less-or-equal to zero.

Figure 25:
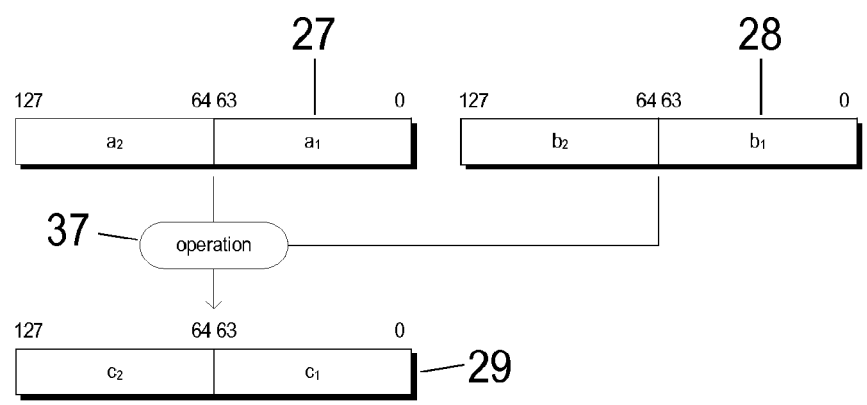
FIG. 25 depicts a binary modal interval operation, which takes operands $[a_1, a_2]$ and $[b_1, b_2]$ as input and produces a result $[c_1, c_2]$.

FIG. 25 shows a binary modal interval operation for example computes in a functional element 37. Element 37 may comprise one or more sub-elements and may be implemented as hardware, firmware or software. Element 37 takes operands $[a_1, a_2]$ and $[b_1, b_2]$ held respectively in registers 27 and 28 as input and produces a result $[c_1, c_2]$ held in a result register 29.

Figure 26:
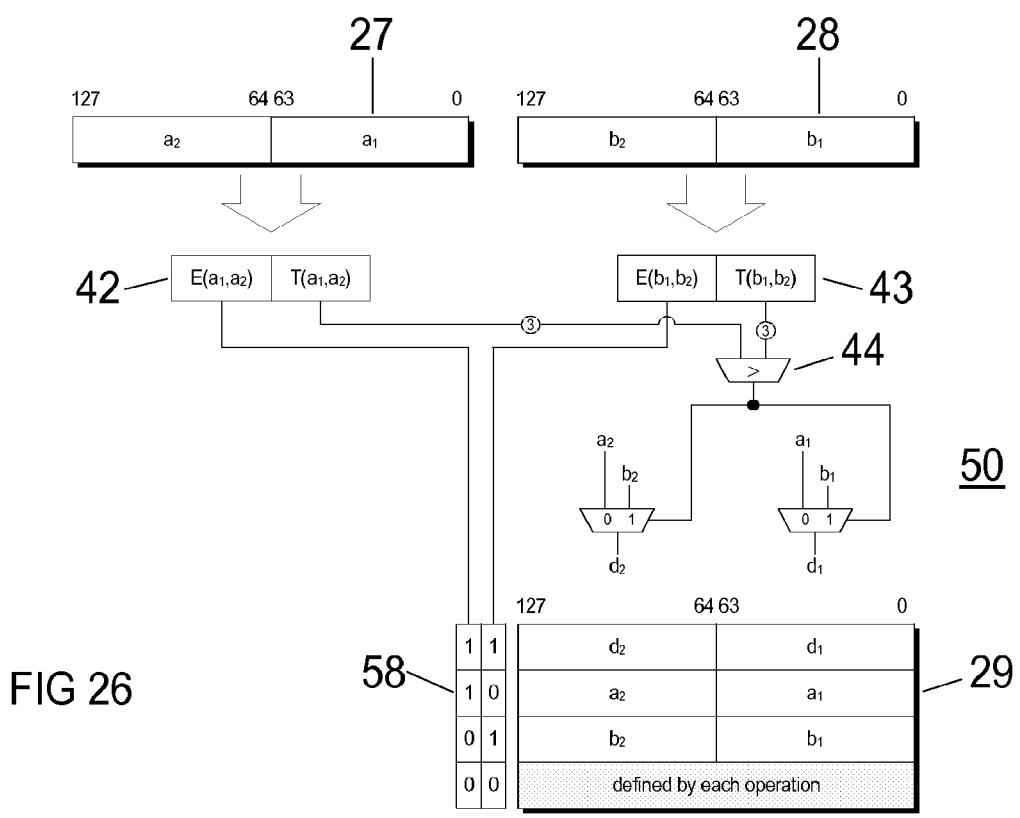
FIG. 26 is a logic diagram for a binary modal interval operation using decorations.

FIG. 26 is a more detailed logic diagram of FIG. 25. A comparator 44 receives the tracking decoration bits derived from the operands 27 and 28 and then provides a 1 output when the three tracking bits $T(a_1, a_2)$ are numerically larger than the three tracking bits $T(b_1, b_2)$, and a 0 output otherwise. Logic elements 50 produce a truth table 58 that specifies the value in result register 29. A truth table value of 0 0 selects the computation function associated with the particular operation. A truth table value of 1 1 selects a value $[d_1, d_2]$ produced by multiplexing operands 27 and 28 based on the output of comparator 44. The other truth table values specify the result defined for that truth table value. The logic elements 50 are a function of the Empty (E) bit and Tracking Decoration (T) pairs 42 and 43 associated respectively with operands 27 and 28. If $[a_1, a_2]$ or $[b_1, b_2]$ is an encoding of non-interval data, i. e., if $[a_1, a_2]$ or $[b_1, b_2]$ is an encoding of a decorated empty set, the result of the operation is one of the operands [a₁, a₂] or [b₁, b₂]. If both operands are decorated empty sets, then the operand with the minimum Tracking Decoration is the result, taking care to return operand [a₁, a₂] in the event both operands are decorated empty sets with the same Tracking Decoration; if only one operand is a decorated empty set, then the operand which is the decorated empty set is the result of the operation; otherwise [a₁, a₂] and [b₁, b₂] are both encodings of a bounded or unbounded modal interval and the result is defined differently for each operation.

FIGS. 27-34 depict the result of several binary modal interval operations after a determination has been made that the operands [a₁, a₂] and [b₁, b₂] in FIG. 26 are both encodings of a bounded or unbounded modal interval.

Figure 27:
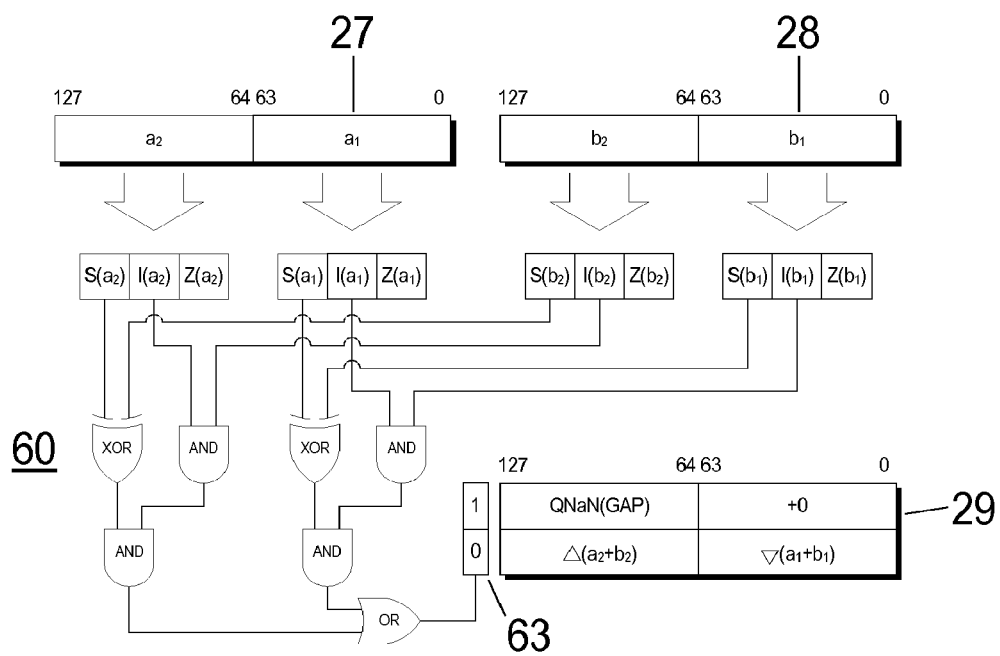
FIG. 27 is a logic diagram for a modal interval addition operation.

FIG. 27 is a logic diagram for a binary modal interval addition operation. The operation is not defined if $a_1+b_1$ or $a_2+b_2$ is a sum of infinities of opposite sign or if the sums $a_1+b_1$ and $a_2+b_2$ are infinities of the same sign. If the operation is not defined, the result is an encoding of the decorated empty set (Ø, GAP).

Figure 28:
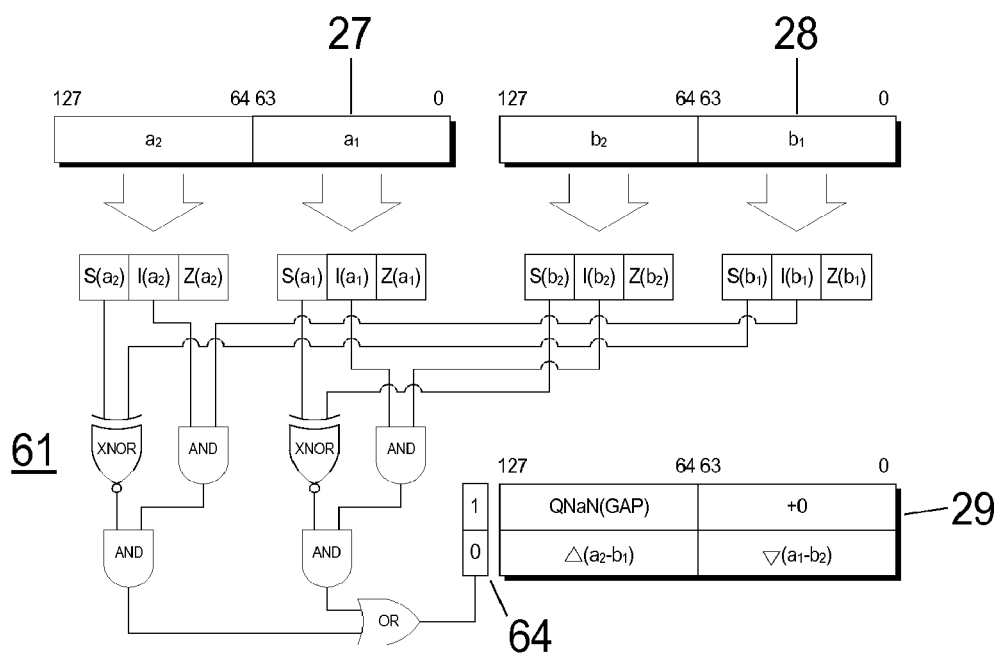
FIG. 28 is a logic diagram for a modal interval subtraction operation.

FIG. 28 is a logic diagram for a binary modal interval subtraction operation. The operation is not defined if $a_1-b_2$ or $a_2-b_1$ is a difference of infinities of the same sign or if the differences $a_1-b_2$ and $a_2-b_1$ are infinities of the same sign. If the operation is not defined, the result is an encoding of the decorated empty set (Ø, GAP).

Figure 29:
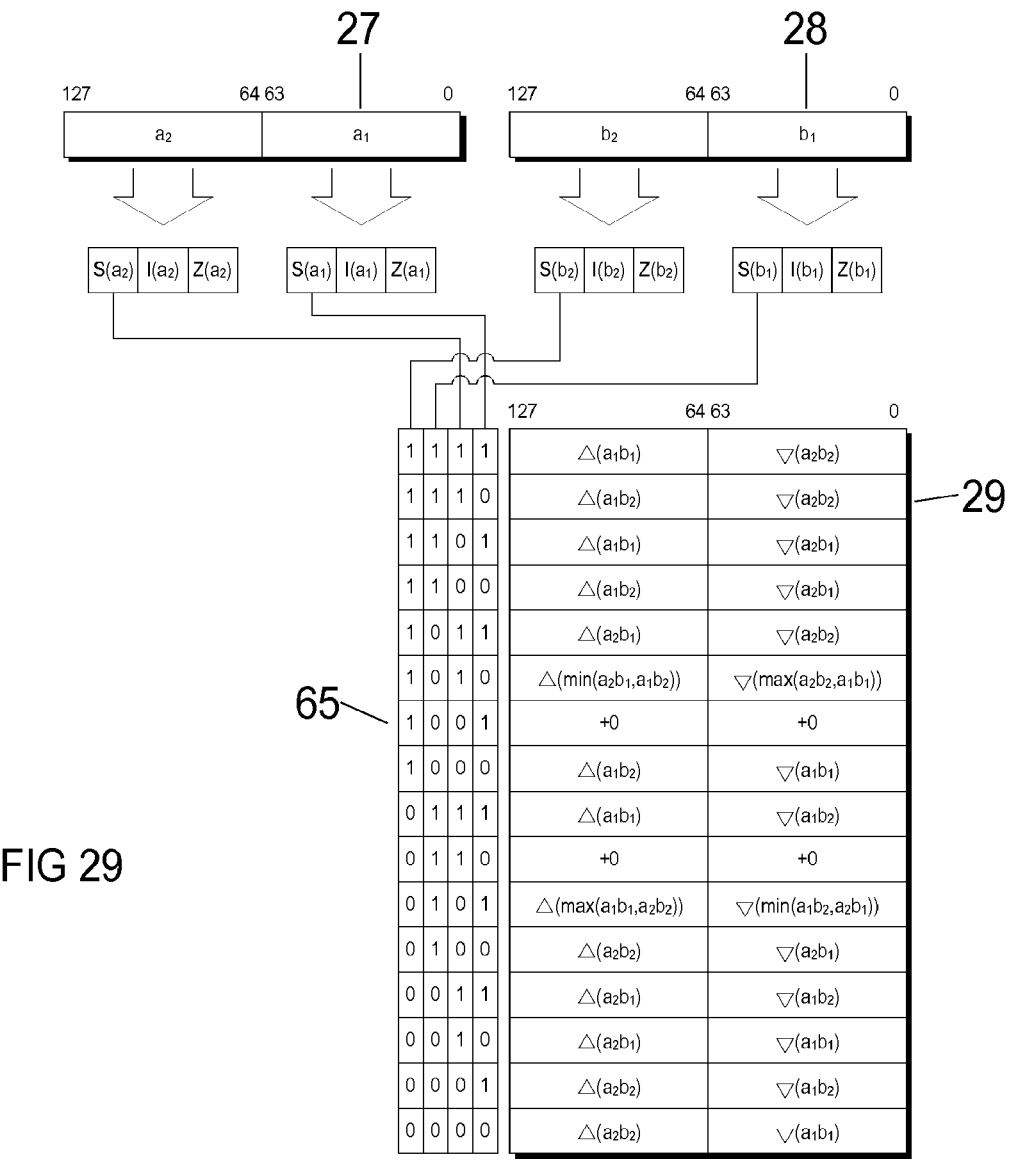
FIG. 29 is a logic diagram for a modal interval multiplication operation.

FIG. 29 is a logic diagram for a binary modal interval multiplication operation. If $a_1$, $a_2$, $b_1$ or $b_2$ is an infinity or a zero, the result of the operation may require a floating-point multiplication of an infinity and a zero. According to the IEEE 754-2008 standard, a floating-point multiplication of an infinity and a zero is an undefined operation and may return a NaN. The modal interval multiplication operation deviates from this convention and instead defines the floating-point multiplication of an infinity and a zero to be $$(-\infty)(-0)=(-0)(-\infty)=+0$$

$$(-\infty)(+0)=(+0)(-\infty)=-0$$

$$(+\infty)(-0)=(-0)(+\infty)=-0$$

$$(+\infty)(+0)=(+0)(+\infty)=+0$$

according to applicant's U.S. Pat. No. 8,204,926 entitled "Reliable and Efficient Modal Interval Arithmetic Operations." The modal interval multiplication operation is therefore always defined so long as the operands [a₁, a₂] and [b₁, b₂] are bounded or unbounded modal intervals.

Figure 30:
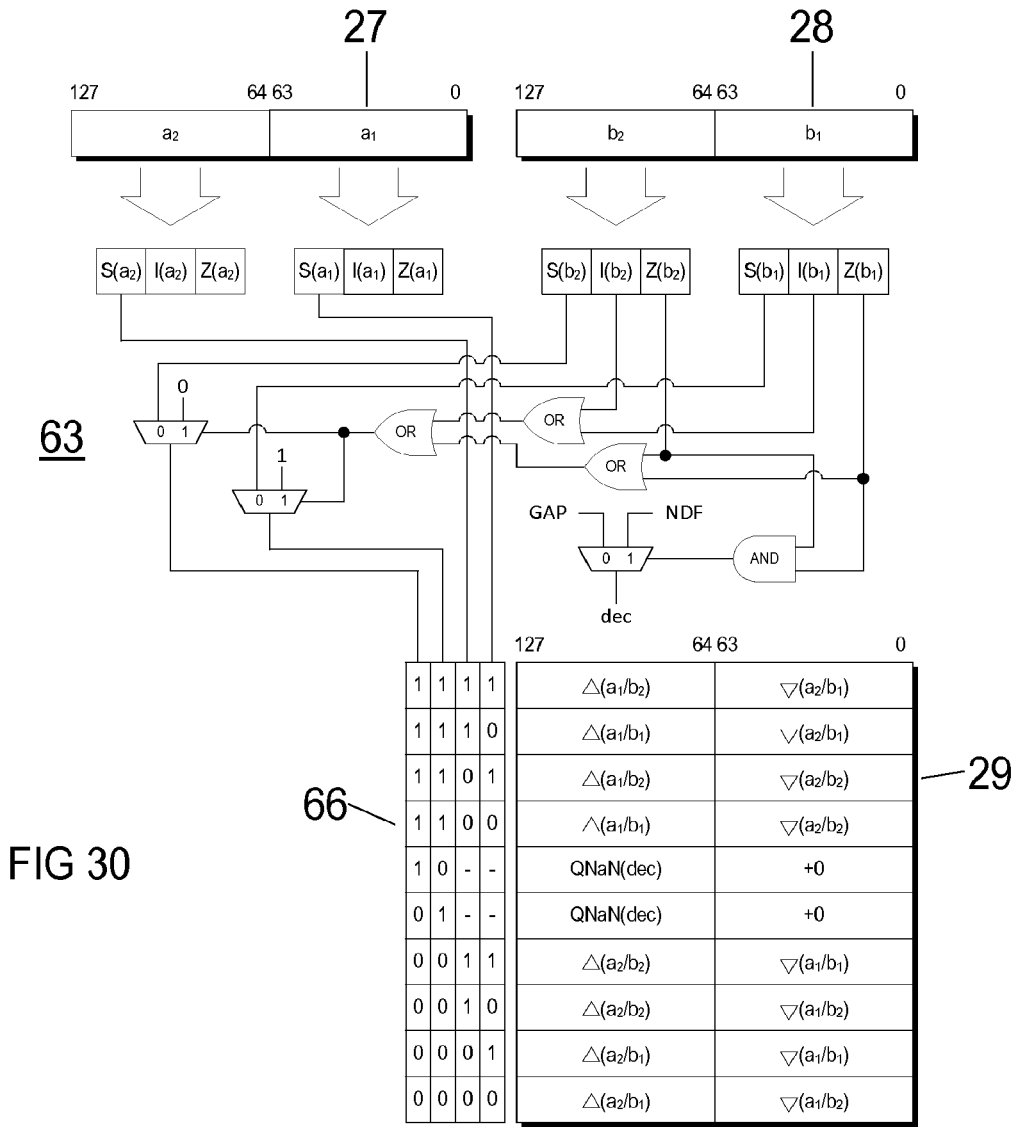
FIG. 30 is a logic diagram for a modal interval division operation.
Figure 31:
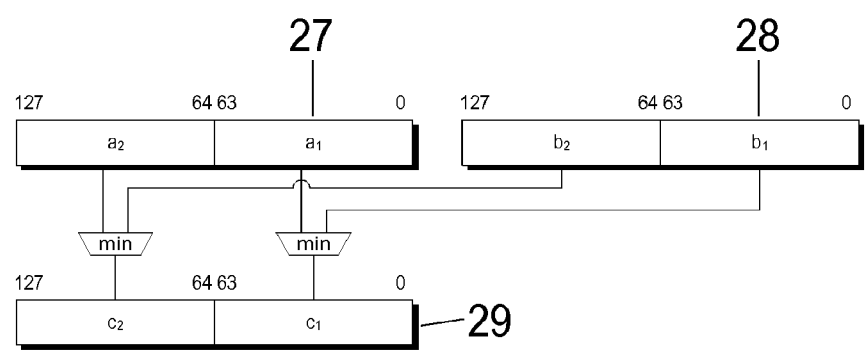
FIG. 31 is a logic diagram for a modal interval minimum operation.
Figure 32:
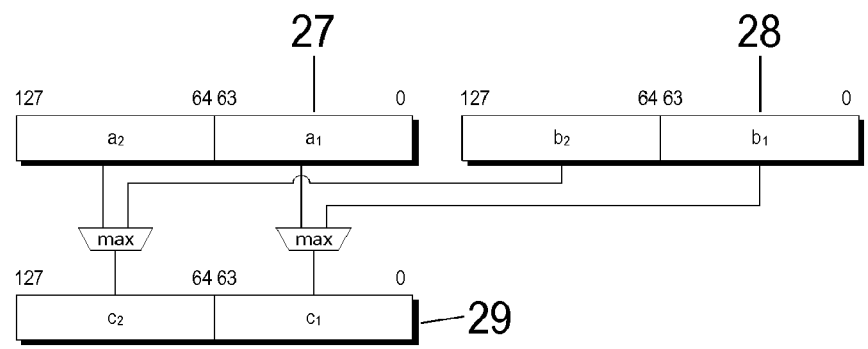
FIG. 32 is a logic diagram for a modal interval maximum operation.
Figure 33:
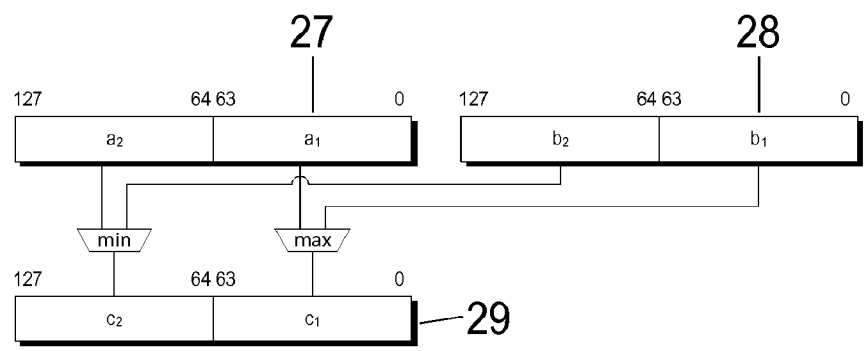
FIG. 33 is a logic diagram for a modal interval meet operation.
Figure 34:
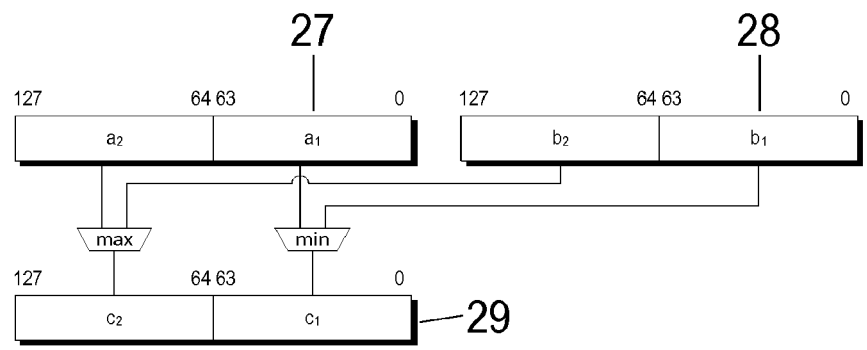
FIG. 34 is a logic diagram for a modal interval join operation.

FIG. 30 is a logic diagram for a binary modal interval division operation.

FIGS. 31-34 are logic diagrams, respectively, for the binary modal interval lattice operations minimum, maximum, meet and join. Since the minimum and maximum of floating-point numbers is exact, all of the lattice operations are exact and require no rounding operators. It is possible the minimum and maximum operations may produce a result which is a representation of the decorated empty set (Ø, GAP), encoded as [-∞, -∞] for the minimum operation and [+∞, +∞] for the maximum operation.

What is claimed:

1. Apparatus for calculating a first result modal interval dependent on a first modal interval, each said modal interval defined by first and second endpoints each comprising sign, fraction and exponent bit fields, said apparatus comprising:
   a) a first operand register for holding the first and second endpoints of the first modal interval, and for providing a first operand signal specifying the contents of the first modal interval endpoints' fields;
   b) a first analysis element for receiving the first operand signal, for creating a first truth table for the first endpoint and a second truth table for the second endpoint, each truth table including a sign bit (S) indicating the sign of the respective endpoint, a not-a-number bit (N) indicating whether the respective endpoint is Not-a-Number, an infinity bit (I) indicating whether the respective endpoint is infinity and a zero bit (Z) indicating whether the respective endpoint is zero;
   c) a first logic array for determining a classification from the first and second truth tables, the classification including an empty bit (E) and, optionally, a tracking decoration (T), wherein:
      when the first and second truth tables indicate that the first and second endpoints have the same sign and a value of infinity, the empty bit is 1 and the tracking decoration indicates an empty or non-empty restriction;
      when the first and second truth tables indicate that one of the first and second endpoints are not-a-number, the empty bit is 1 and the tracking decoration is the NaN decoration field from the not-a-number endpoint;
      when the first and second truth tables indicate that both of the first and second endpoints are not-a-number, the empty bit is 1 and the tracking decoration indicates an empty input restriction;
      otherwise the empty bit is 0 and the tracking decoration is not used; and,
   d) a first computational element receiving the first operand signal and the empty bit value signal, and performing a computation associated with the first computational element using the data encoded in the first operand signal and the empty bit value signal, and providing a result signal encoding the first result modal interval as a result of the computation by the first computational element.

2. The apparatus of claim 1, wherein the first analysis element creates the first and second truth tables dependent on a preselected exponent field bit configuration in each of the first and second endpoints, and on a preselected fraction field configuration in each of the first and second endpoints.

3. The apparatus of claim 1 adapted for calculating a second result modal interval dependent on the first modal interval and on a second modal interval having the same structure as the first modal interval and having a third endpoint and a fourth endpoint, comprising:
   a) a second operand register for holding the third endpoint and the fourth endpoint of the second modal interval, and for providing a second operand signal specifying the contents of the second modal interval's endpoints' fields;
   b) a second analysis element for receiving the second operand signal, creating a third truth table for the third endpoint and a fourth truth table for the fourth endpoint;
   c) a second logic array for determining a classification from the third and fourth truth tables, the classification including an empty bit (E) and, optionally, a tracking decoration (T), wherein:
      when the third and fourth truth tables indicate that the third and fourth endpoints have the same sign and a value of infinity, the empty bit is 1 and the tracking decoration indicates an empty or non-empty restriction;

when the third and fourth truth tables indicate that one of the third and fourth endpoints are not-a-number, the empty bit is 1 and the tracking decoration is the NaN decoration field from the not-a-number endpoint;

when the third and fourth truth tables indicate that both of the third and fourth endpoints are not-a-number, the empty bit is 1 and the tracking decoration indicates an empty input restriction;

otherwise the empty bit is 0 and the tracking decoration is not used;

d) a third logic array for receiving the classifications and generating therefrom first and second multiplexer control signals;

e) at least first and second multiplexers each having a control terminal for receiving respectively the first and second multiplexer control signals at the control terminals thereof, each multiplexer further having first and second data terminals, and each multiplexer gating data present at one of the first and second data input terminals as selected by the multiplexer control signal to create a multiplexer output signal at an output terminal of the multiplexer involved encoding the bit values present at the selected input terminal;

f) connections providing the contents of selected bits in the first and second endpoints to respectively, the first multiplexer's first and second data terminals;

g) connections providing the contents of selected bits in the third and fourth endpoints to respectively, the second multiplexer's first and second data terminals; and, h) a second computational element for receiving the first and second operands signals, the first and second empty bit value signals, and the first and second multiplexer output terminal signals, and performing a computation associated with the second computational element using the data encoded in the first and second operand signals, the empty bit value signals, and the first and second multiplexer output signals, and providing a second result signal encoding the second result modal interval as a result of the computation by the second computational element.

* * * * *